(12) United States Patent
Lu (10) Patent No.: US 12,109,495 B2
(45) Date of Patent: Oct. 8, 2024

(54) SERVER ARCHITECTURE AND METHOD FOR IMPLEMENTING ONLINE MULTI-PLAYER GAMES

(71) Applicant: Garena Online Private Limited, Singapore (SG)

(72) Inventor: Chen Lu, Singapore (SG)

(73) Assignee: Garena Online Private Limited, Singapore (SG)

( * ) Notice: Subject to any disclaimer, the term of this patent is extended or adjusted under 35 U.S.C. 154(b) by 158 days.

(21) Appl. No.: 17/764,780

(22) PCT Filed: Nov. 12, 2021

(86) PCT No.: PCT/SG2021/050694
§ 371 (c)(1),
(2) Date: Mar. 29, 2022

(87) PCT Pub. No.: WO2022/119498
PCT Pub. Date: Jun. 9, 2022

(65) Prior Publication Data
US 2023/0083907 A1    Mar. 16, 2023

(30) Foreign Application Priority Data
Dec. 1, 2020  (SG) .......................... 10202011942V (51) Int. Cl.
*A63F 13/77* (2014.01)
*A63F 13/35* (2014.01)
*A63F 13/795* (2014.01)

(52) U.S. Cl.
CPC .............. *A63F 13/77* (2014.09); *A63F 13/35* (2014.09); *A63F 13/795* (2014.09)

(58) Field of Classification Search
CPC ........ A63F 13/77; A63F 13/35; A63F 13/795; A63F 13/79; A63F 13/352
(Continued)

(56) References Cited

U.S. PATENT DOCUMENTS 9,596,564 B2 *  3/2017  Li .......................... H04W 4/023
10,376,792 B2    8/2019  Marr et al.
(Continued)

FOREIGN PATENT DOCUMENTS

CN        109327542        2/2019

*Primary Examiner* — Michael A Cuff
(74) *Attorney, Agent, or Firm* — David R. Stevens; Stevens Law Group (57) ABSTRACT

A server architecture and method for implementing online multi-player games are disclosed, the server architecture comprising regional servers, each of the regional servers having a designated region and configured to perform matchmaking for client devices based on the designated region. The server architecture further comprises a central data server configured to receive an identifier from a client device; select a regional server based on the identifier and the designated regions, and send a regional server ID of the selected regional server to the client device. Wherein the selected regional server is configured to receive from the central data server, player profile data associated with the identifier; and perform matchmaking by grouping the client device in an online play session with other client devices based on the designated region of the selected regional server.

20 Claims, 6 Drawing Sheets

(58) Field of Classification Search
USPC .......................................................... 463/42
See application file for complete search history.

(56) References Cited

U.S. PATENT DOCUMENTS

| | | | |
|---|---|---|---|
| 10,807,006 B1* | 10/2020 | Davis | A63F 13/30 |
| 10,894,215 B1* | 1/2021 | Brown | A63F 13/35 |
| 11,405,098 B1* | 8/2022 | Burns | H04B 7/18539 |
| 11,765,244 B1* | 9/2023 | Barclay | H04L 67/51 |
| | | | 709/226 |
| 2002/0107008 A1* | 8/2002 | Hendrey | H04W 76/40 |
| | | | 455/518 |
| 2014/0012674 A1* | 1/2014 | Piccionielli | H01M 8/0662 |
| | | | 705/14.55 |
| 2014/0013420 A1* | 1/2014 | Picionielli | G06F 21/606 |
| | | | 726/17 |
| 2019/0091575 A1 | 3/2019 | Reiche, III et al. | |

* cited by examiner

| Region | ID of Regional servers |
|--------|------------------------|
| ASIA | Regional server 1<br>Regional server 2<br>Regional server 3 |
| EUROPE | Regional server 4<br>Regional server 5 |
| AMERICAS | Regional server 6 |

SERVER ARCHITECTURE AND METHOD FOR IMPLEMENTING ONLINE MULTI-PLAYER GAMES

FIELD OF THE INVENTION

The invention pertains to a server architecture and method for implementing online multi-player games.

BACKGROUND

Online multi-player game play is prevalent in today's culture. Through a network of servers, players in different regions of the world (e.g. Americas, Europe, Asia) can play such games cooperatively or combatively with each other. The implementation of these online multi-player games can be done either via (1) a centralized server architecture, where a centralized server cluster caters to all regions, or via (2) a distributed server architecture, where distributed server clusters cater to different regions.

However, both methodologies have drawbacks. For instance, in a centralized server architecture, there would invariably be devices in certain regions that would be geographically far away from the centralized server cluster. These devices would experience high network latency and players would have a bad game experience. Furthermore, due to the varying distances from the centralized server, some devices will experience higher latency than others during match play, making the game uneven and unfair.

A problem with a distributed server architecture is scalability. If the online multi-player game is to be launched in a new region, time would be required to deploy the new server cluster, which may significantly delay the roll-out. Furthermore, the deployment of a new server cluster in each new region would be expensive and highly cost inefficient.

Thus, what is required is a novel hybrid server architecture and method which marries both the centralized and distributed frameworks to solve the aforementioned problems by reducing latency of players while being scaled efficiently. Furthermore, other desirable features and characteristics will become apparent from the subsequent detailed description and the appended claims, taken in conjunction with the accompanying drawings and this background of the disclosure.

SUMMARY OF INVENTION

According to a first aspect of the invention, a server architecture for implementing an online multi-player game is described, the server architecture comprising a plurality of regional servers, each of the plurality of regional servers having a designated region and configured to perform matchmaking for only client devices that belong to the designated region. The server architecture further comprises a central data server configured to receive an identifier from a client device; select a regional server from the plurality of regional servers based on the identifier and the designated regions; send a regional server ID of the selected regional server to the client device; and provide player profile data to each of the plurality of regional servers. Wherein the selected regional server is configured to receive from the central data server, player profile data associated with the identifier; and perform matchmaking by grouping the client device in an online play session with other client devices that belong to the designated region of the selected regional server.

Preferably, the central data server comprises a server database, the server database storing a relationship between the plurality of regional servers and the designated regions; and wherein the central data server selects a regional server from the plurality of regional servers based on the identifier and the designated regions by querying the server database with region information associated with the identifier, and determining at least one of the plurality of regional servers having the designated region that matches the region information associated with the identifier.

Preferably, the region information associated with the identifier matches the region information associated with identifiers sent by the other client devices in the online play session.

Preferably, the central data server determines that more than one of the plurality of regional servers has a designated region that matches the region information, and the central data server selects the regional server based on latency or workload or language considerations.

Preferably, the central data server comprises a player profile database, the player profile database storing the identifier and the associated player profile data.

Preferably, the plurality of regional servers are set up in an etcd network and wherein the central data server selects a regional server from the plurality of regional servers based on the identifier and the designated regions by querying a configuration file and determining at least one of the plurality of regional servers having the designated region that matches the region information associated with the identifier.

Preferably, the central data server is further configured to select the selected regional server from the plurality of regional servers based on a region as indicated by a current IP address of the client device, as opposed to selecting the selected regional server based on the identifier.

Preferably, the server architecture further comprises a gaming server, wherein the selected regional server is further configured to send a gaming server ID of the gaming server to the client device; and wherein the central data server is further configured to receive game statistics of the online play session from the gaming server and update the player profile data associated with the identifier with the game statistics.

Preferably, the selected regional server performs matchmaking by obtaining the latency of the client device with respect to the gaming server, and grouping the client device with the other client devices having a substantially similar latency with respect to the gaming server, in the online play session.

Preferably, the selected regional server and the central data server are located in separate locations and the selected regional server is geographically closer to the client device than the central data server.

Preferably, the identifier is a player ID or a device ID.

According to a second aspect of the invention, a method for implementing an online multi-player game is described, the method comprising the steps of receiving, at a central data server, an identifier from a client device; and selecting, at the central data server, a regional server from a plurality of regional servers based on the identifier and a designated region of each of the plurality of regional servers, each of the plurality of regional servers configured to perform matchmaking for only client devices that belong to the designated region, and the central data server is configured to provide player profile data to each of the plurality of regional servers. The method further comprises the steps of sending, from the central data server to the client device, a regional server ID of the regional server; receiving, at the regional server, the identifier from the client device; and sending, from the regional server to the central data server, the identifier. The method further comprises the steps of receiving, at the regional server, player profile data associated with the identifier from the central data server; and performing, by the regional server, matchmaking, by grouping the client device in an online play session with other client devices that belong to the designated region of the regional server.

Preferably, the central data server comprises a server database, the server database storing a relationship between the plurality of regional servers and the designated regions; and the step of selecting, at the central data server, a regional server from a plurality of regional servers based on the identifier and a designated region of each of the plurality of regional servers comprises the steps of querying the server database with region information associated with the identifier; and determining that the designated region of at least one of the plurality of regional servers matches the region information associated with the identifier.

Preferably, the region information associated with the identifier matches the region information associated with identifiers sent by the other client devices in the online play session.

Preferably, more than one of the plurality of regional servers has the designated region that matches the region information, and the method further comprises the step of selecting the regional server based on latency or workload or language considerations.

Preferably, the central data server comprises a player profile database, the player profile database storing the identifier and the associated player profile data.

Preferably, the method further comprises the steps of selecting, at the central data server, the regional server from the plurality of regional servers based on a region as indicated by a current IP address of the client device, as opposed to selecting the regional server based on the identifier.

Preferably, the method further comprises the steps of sending, from the regional server to the client device, a gaming server ID of a gaming server; receiving, at the central data server, game statistics of the online play session from the gaming server; and updating, at the central data server, the player profile data associated with the identifier, with the game statistics.

Preferably, the step of performing matchmaking by the regional server comprises the steps of obtaining the latency of the client device with respect to the gaming server, and grouping the client device with the other client devices having a substantially similar latency with respect to the gaming server, in the online play session.

Preferably, the regional server and the central data server are located in separate locations and the regional server is geographically closer to the client device than the central data server.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

Skilled artisans will appreciate that elements in the figures are illustrated for simplicity and clarity and have not necessarily been depicted to scale. For example, the dimensions of some of the elements in the block diagrams or steps in the flowcharts may be exaggerated in respect to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It is the intent of certain embodiments to teach a server architecture for implementing an online multi-player game, the server architecture comprising a plurality of regional servers, each of the plurality of regional servers having a designated region and configured to perform matchmaking for client devices based on their designated region.

The server architecture also comprises a central data server, the central data server configured to receive an identifier from a client device; select a regional server from the plurality of regional servers based on the identifier and the designated regions; send a regional server ID of the selected regional server to the client device; and provide player profile data to each of the plurality of regional servers.

Wherein the selected regional server is configured to receive from the central data server, player profile data associated with the identifier; and perform matchmaking by grouping the client device in an online play session with other client devices based on the designated region of the selected regional server.

A central data server, with multiple regional servers each responsible for performing matchmaking only for client devices that belong to their designated region are thus described. This architecture and methodology provide certain advantages. As each regional server is designated for a specific region, and the allocation of client devices to which selected regional server (by the central data server) is according to that designation, a particular regional server will only match client devices that belong to its specific region (e.g. players that had been registered with that specific region or client devices that are located within that specific region) in an online play session.

The result is that overwhelmingly, only client devices that are located within the same region (or client devices that are geographically close together) will be matched together in an online play session. This ensures that the latency during the online play session would be kept to an acceptable level. Furthermore, the described invention enforces the requirement that players from different regions are abstained from playing together. As a result, players with vastly different latencies will not be grouped together in an online play session, thereby achieving the objective of fairness, and making the gameplay more equitable and even.

The disclosed server architecture and method also emphasizes a clear demarcation of responsibilities between the central data server and the regional servers. The central data server serves as a nexus point in the server architecture for data storage and dissemination to the regional servers. The central data server stores and updates the player profile data and disseminates the player profile data to the regional servers. As the central data server does the selecting of the regional server and sends the regional server ID of the selected regional server to the client devices to which they need to establish connection to, the central data server is therefore responsible for determining which client devices are to be allocated or assigned to which regional servers for matchmaking. Thus, the disclosed server architecture is very scalable. If the online multi-player game is to be launched in a new region, all that needs to be done is to deploy new regional servers to cater to the client devices within the new region. These new regional servers would be able to "piggyback" on the existing infrastructure as provided by the central data server for player profile data, and for the allocation of client devices (which belong to the new region) to the new regional server for matchmaking, thereby significantly shortening the deployment time and avoiding the costs to set up additional servers.

To put it in another way, the segregation of duties is such that "regional" (or in the vicinity) servers are responsible for tasks (i.e., matchmaking) that involves connecting to multiple client devices in a substantially synchronous fashion and which are therefore particularly sensitive to network latency. While the "central" (or server that is further away) server is responsible for tasks (i.e., providing player profile data and regional server ID) that involves providing data to regional servers and client devices in an asynchronous fashion and which are therefore not particularly sensitive to network latency. This segregation of tasks allows the disclosed architecture to reap the aforementioned advantages.

Figure 1:
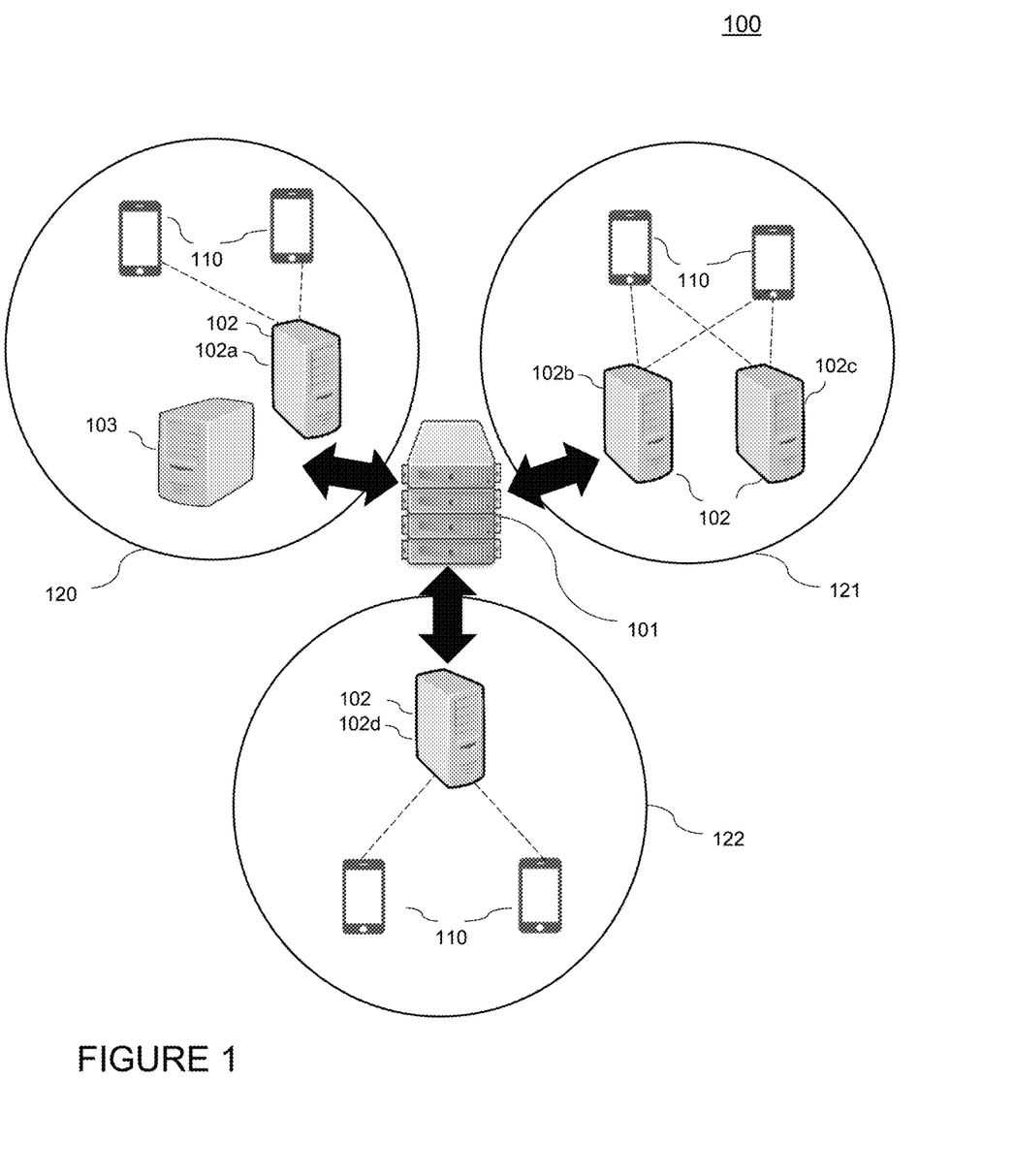
FIG. 1 shows a server architecture for implementing online multi-player games, in accordance with certain embodiments.

FIG. 1 shows a server architecture 100 for implementing online multi-player games, in accordance with certain embodiments. Server architecture 100 comprises central data server 101 and regional servers 102. Server architecture 100 can also comprise gaming servers 103.

Figure 2:
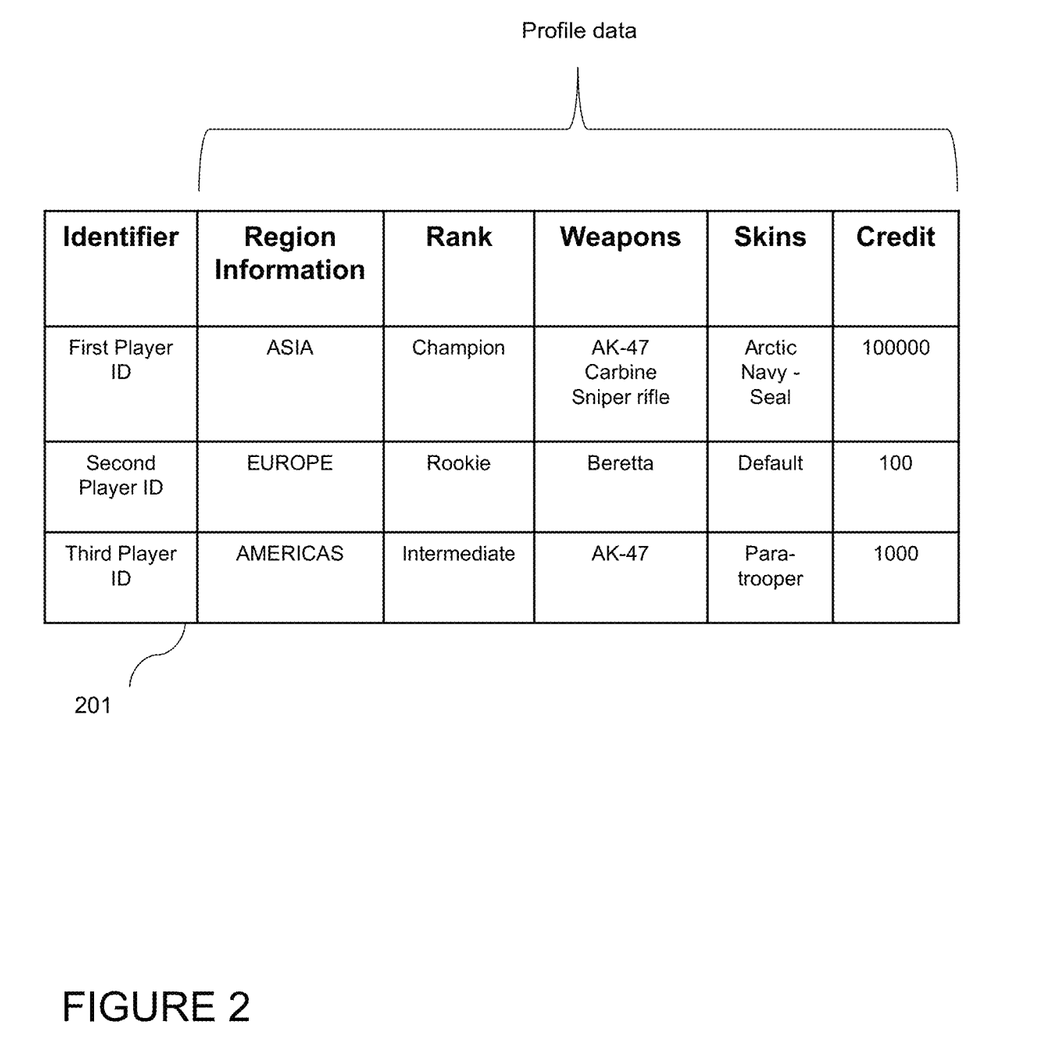
FIG. 2 shows an exemplary illustration of a player profile database, in accordance with certain embodiments.

Central data server 101 is configured to store the player profile data of the players. Central data server 101 can be a server or a cluster of servers in a single location. Central data server 101 can be located in a centralized location. Central data server 101 can have player profile database 201 to store the player profile data of the players. FIG. 2 shows an illustration of player profile database 201. Each entry in the database can have an identifier (which uniquely identifies the player) functioning as a key with the corresponding or associated player profile data of the player. The identifier can be a player identifier (ID). In embodiments, the identifier can be device identifier (ID) like a media access control address (MAC address). The player profile data associated with the identifier can include region information, the region information indicating the region the player has registered with. The region information can be specified by the player during the registration process. Alternatively, the region information can be automatically determined based on the IP address of the client device at the time of the registration process. The player profile data can also non-exhaustively include information pertaining to player attributes like rank, player skins, available weaponry, credit, historical game statistics (e.g. win loss record), language preferences and the like.

Central data server 101 functions as the nexus point in server architecture 100 for providing the player profile data to the plurality of regional servers 102. Central data server 101 is configured to receive from each of the regional servers 102 a player profile request comprising the identifier. By referencing the identifier in player profile database 201, the corresponding or associated player profile data can be retrieved. Central data server 101 is configured to send the retrieved player profile data to each of the regional servers 102.

Central data server 101 also functions as the nexus point in server architecture 100 for updating the player profile data of the players. Central data server 101 is configured to send data to and receive data from gaming servers 103. Central data server 101 is configured to receive game statistics from gaming servers 103. These game statistics are typically sent by gaming servers 103 to central data server 101 at the conclusion of the online play session or match. Upon receipt of the game statistics, central data server 101 is configured to update player profile database 201 with the game statistics such that the player profile data of the players reflects the outcome of the online play session.

Central data server 101 also functions as the nexus point in server architecture 100 for sending to client devices 110, the regional server ID of the selected regional server 102. In other words, central data server 101 is responsible for determining which client devices 110 are to be allocated or assigned to which regional servers 102 for matchmaking. Central data server 101 is configured to send data to and receive data from client devices 110. Client devices 110 can non-exhaustively include smart phones, tablets, gaming consoles, desktops, laptops, and the like.

Central data server 101 is configured to receive from client devices 110 a matchmaking request comprising the identifier. Upon receiving the matchmaking request, central data server 101 can select the regional server 102 based on the identifier and the designated regions. By referencing the identifier, region information in the corresponding or associated player profile data can be retrieved from player profile database 201. The selection of regional server 102 can then be a matter of selecting the regional server 102 whose designated region matches the region information in the associated player profile data. Therefore, in this way, central data server 101 is responsible for determining which client devices 110 are to be allocated or assigned to which regional servers 102 for matchmaking. Central data server 101 is also configured to handle other data related requests from client devices 110. These data related requests can include purchasing requests and emails.

Figure 3:
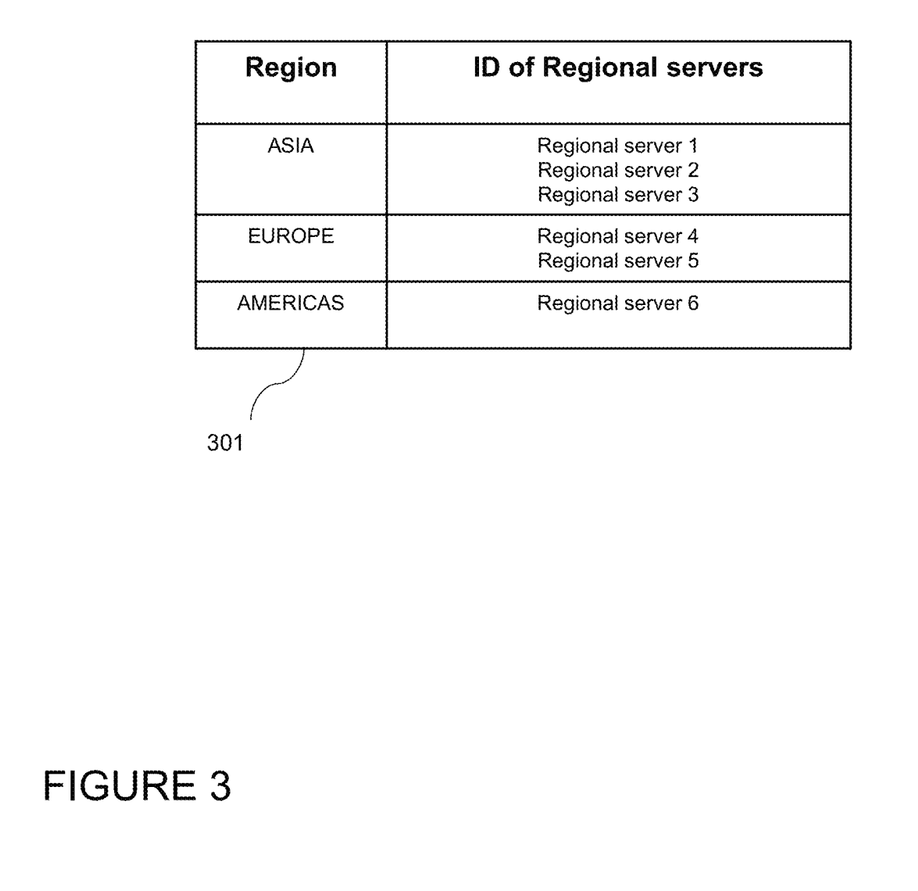
FIG. 3 shows an exemplary illustration of a server database, in accordance with certain embodiments.

Central data server 101 can have server database 301. Server database 301 can store the relationship between regional servers 102 and their designated regions. FIG. 3 shows an illustration of server database 301. As shown, "Regional server 1", "Regional server 2" and "Regional server 3" are designated to the "ASIA" region, "Regional server 4" and "Regional server 5" are designated to the "EUROPE" region and "Regional server 6" is designated to the "AMERICAS" region. Central data server 101 can query server database 301 with the region information associated with the identifier to determine the region which matches the region information and select one of the regional servers 102 designated to that region. For example, if the region information associated with the identifier is "ASIA", the selected regional server 102 can either be "Regional server 1", "Regional server 2" or "Regional server 3".

In embodiments, regional servers 102 can be set up in an etcd network. Regional servers 102 can be configured via a configuration file. Central data server 101 can amend the configuration file to assign a regional server 102 to a designated region. The configuration file can also specify the designated regions of regional servers 102. Central data server 101 can query the configuration file to determine the designated regions of regional servers 102 and select a regional server 102 whose designated region matches the region information associated with the identifier. Furthermore, the advantage of an etcd network is that regional servers 102 can easily be deployed to service new designated regions by simply amending the configuration file, thereby promoting scalability.

Matchmaking is the process by which regional servers 102 concurrently establish connections with client devices 110 to assess the viability of having an online play session among those client devices 110. Regional servers 102 are configured to perform matchmaking for client devices 110 based on their designated region or client devices 110 that belong to their designated region. For example, regional servers 102 are configured to only perform matchmaking for client devices 110 whose region information associated with the identifier matches the designated region of regional sever 102. In another example, regional servers 102 are configured to only perform matchmaking for client devices 110 that are located within their designated region.

As shown in FIG. 1, regional server 102*a* is designated to region 120, regional servers 102*b*, 102*c* are designated to region 121 and regional server 102*d* is designated to region 122. Regional server 102*a* can only matchmake client devices 110 that belong to region 120 (i.e. region information associated with the identifier is also region 120 or client device 110 is located within region 120) in an online play session. Regional server 102*a* will not matchmake client devices 110 that belong to region 121 or region 122. Likewise, regional server 102*d* can only matchmake client devices 110 that belong to region 122. Regional server 102*d* will not matchmake client devices 110 that belong to region 120 or region 121.

Regional servers 102 will typically be located within or in close proximity to their designated regions. For example, "Regional server 1", "Regional server 2" and "Regional server 3" will be geographically located within ASIA, or geographically close to ASIA. Regional servers 102 can be in locations which are separate and different from central data server 101. Regional servers 102 will typically be located geographically closer to client devices 110 than central data server 101.

In embodiments, multiple regional servers 102 can be assigned to the same designated region. Central data server 101 will then need to select one regional server 102 out of the group. For example, if the region is "ASIA", "Regional server 1" can be selected over "Regional server 2" and "Regional server 3". Central data server 101 can make this selection by taking into account, for example, latency considerations, workload considerations, language considerations etc. In embodiments, the selection process can even be a rudimentary form of number matching. For example, if there are ten regional servers 102 assigned to a particular region, the first, second, third . . . and tenth regional server 102 will be selected for player IDs ending with 0, 1, 2 . . . 9 respectively. In embodiments, the number of regional servers 102 assigned to a particular region is dependent on the workload. Logically, if a particular region has a higher player population density, more regional servers 102 will be assigned to that region.

Central data server 101 is configured to send to client devices 110, the regional server ID of the selected regional server 102. As mentioned, regional servers 102 can only matchmake client devices 110 that belong to their designated region, and not client devices 110 that belong to other regions. This is enforced by central data server 101 as central data server 101 is the central gateway point that is responsible for determining which client devices 110 are to be allocated or assigned to which regional servers 102 for matchmaking.

In embodiments, if central data server 101 determines that the current IP address of client device 110 is not within the region as indicated by the region information associated with the identifier, central data server 101 may then select regional server 102 based on the region as indicated by the current IP address of client device 110, as opposed to relying on the region information associated with the identifier. This is to enforce the requirement that only client devices 110 physically located within the same region will be matched together in an online play session.

In an alternative embodiment, even though central data server 101 determines that the current IP address of client device 110 is not within the region as indicated by the region information associated with the identifier, central data server 101 will still rely on the region information (specified by the player or based on the IP address of the client device at the time of player registration), and select regional server 102 on this basis. For example, player enters the region information as "Thailand" during player registration. However, the player is a resident of the United States. When the player returns to the United States and sends a matchmaking request to central data server 101, central data server 101 will ignore or disregard that the current IP address of client device 110 is not within the region as indicated by the region information, and select for the player a regional server 102 designated for the "Thailand" region instead. To change the player's region information from "Thailand" to "United States", the player would have to submit a request to an authority.

Regional servers 102 functions as network nodes in server architecture 100. Regional servers 102 are configured to send player profile requests to central data server 101. Regional servers 102 are configured to receive player profile data from central data server 101.

Regional servers 102 are configured to send data to and receive data from client devices 110. Regional servers 102 are configured to receive from client devices 110 a multi-player game request, the multi-player game request including the identifier.

Regional servers 102 are configured to perform matchmaking for client devices 110 based on their designated region or client devices 110 that belong to their designated region. Regional servers 102 can perform matchmaking by grouping client devices 110 that belong to its designated region in online play sessions hosted by gaming server 103 based on gaming considerations. These gaming considerations can be for example, client devices 110 having "similar" latency, or based on the language preferences of the players, or based on game history.

The process of matchmaking can at times take a while. For example, waiting for regional servers 102 to find additional players to meet the quota of players for the online play session. So therefore in the meantime, confirmed players can be placed in a lobby session prior to the commencement of the online play session. Regional servers 102 can be configured to initiate a lobby session by sending lobby data to client devices 110. The lobby data can contain attributes of the online play sessions like map information and team information. The lobby session can also have chat functionality which allows players using client devices 110 to exchange text and voice input with one and another.

Regional servers 102 are configured to send to client devices 110 the gaming server ID of the gaming server 103 selected to host the online play session. This is because there can be a plurality of gaming servers 103. Regional servers 102 can maintain a database of gaming servers 103 with their corresponding gaming server IDs. Regional servers 102 can select gaming server 103 based on gaming considerations. These gaming considerations can be for example, client devices 110 having "similar" latency, or based on the language preferences of the players, or based on game history.

Figure 4:
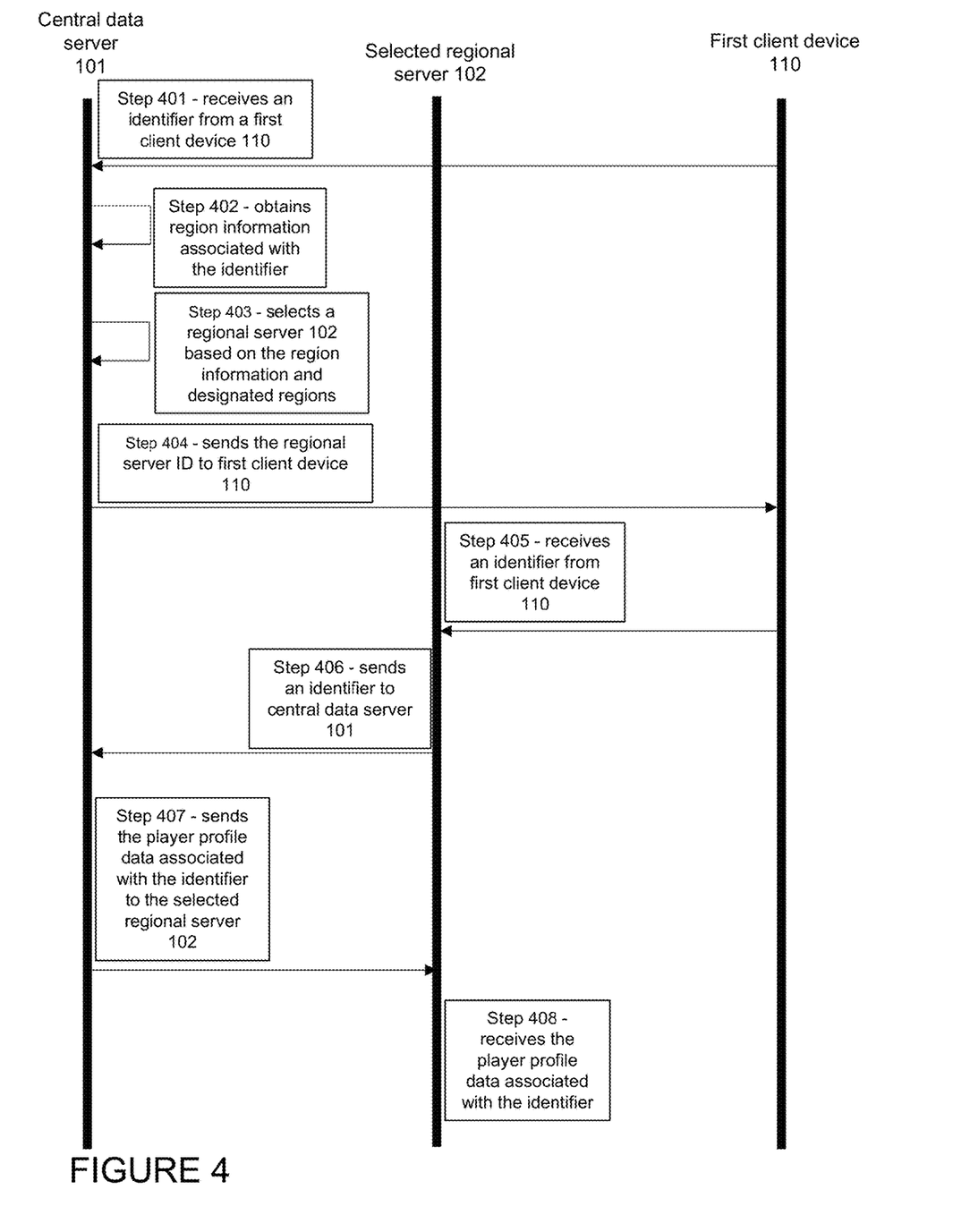
FIG. 4 shows a method that outlines a first part of the matchmaking process for online multi-player games, in accordance with certain embodiments.

FIG. 4 shows a method that outlines the first part of the matchmaking process for online multi-player games, in accordance with certain embodiments.

In step 401, central data server 101 receives a matchmaking request from a first client device 110, the matchmaking request comprising an identifier. The identifier can be a player ID or a device ID.

In step 402, central data server 101 obtains region information associated with the identifier. Central data server 101 can query player profile database 201 with the identifier and retrieve the region information in the player profile data associated with the identifier. For example, the region information can be "ASIA".

In step 403, central data server 101 selects a regional server 102 from the plurality of regional servers 102 based on the region information associated with the identifier and the designated regions. Central data server 101 can query server database 301 with the region information associated with the identifier and select one of the regional servers 102 with a designated region that matches the region information associated with the identifier. If the regional servers 102 are set up in an etcd network, central data server 101 can query the configuration file to determine the designated regions of regional servers 102 and select a regional server 102 whose designated region matches the region information associated with the identifier. For example, if the region information associated with the identifier is "ASIA", central data server 101 selects "Regional server 1" as the selected regional server 102.

In step 404, central data server 101 sends the regional server ID of the selected regional server 102 to the first client device 110.

In step 405, the selected regional server 102 receives a multi-player game request from first client device 110, the multi-player game request including the identifier.

In step 406, the selected regional server 102 sends a player profile request to central data server 101, the player profile request including the identifier.

In step 407, central data server 101 sends the player profile data associated with the identifier to the selected regional server 102. Central data server 101 can retrieve the player profile data associated with the identifier from player profile database 201.

Figure 5:
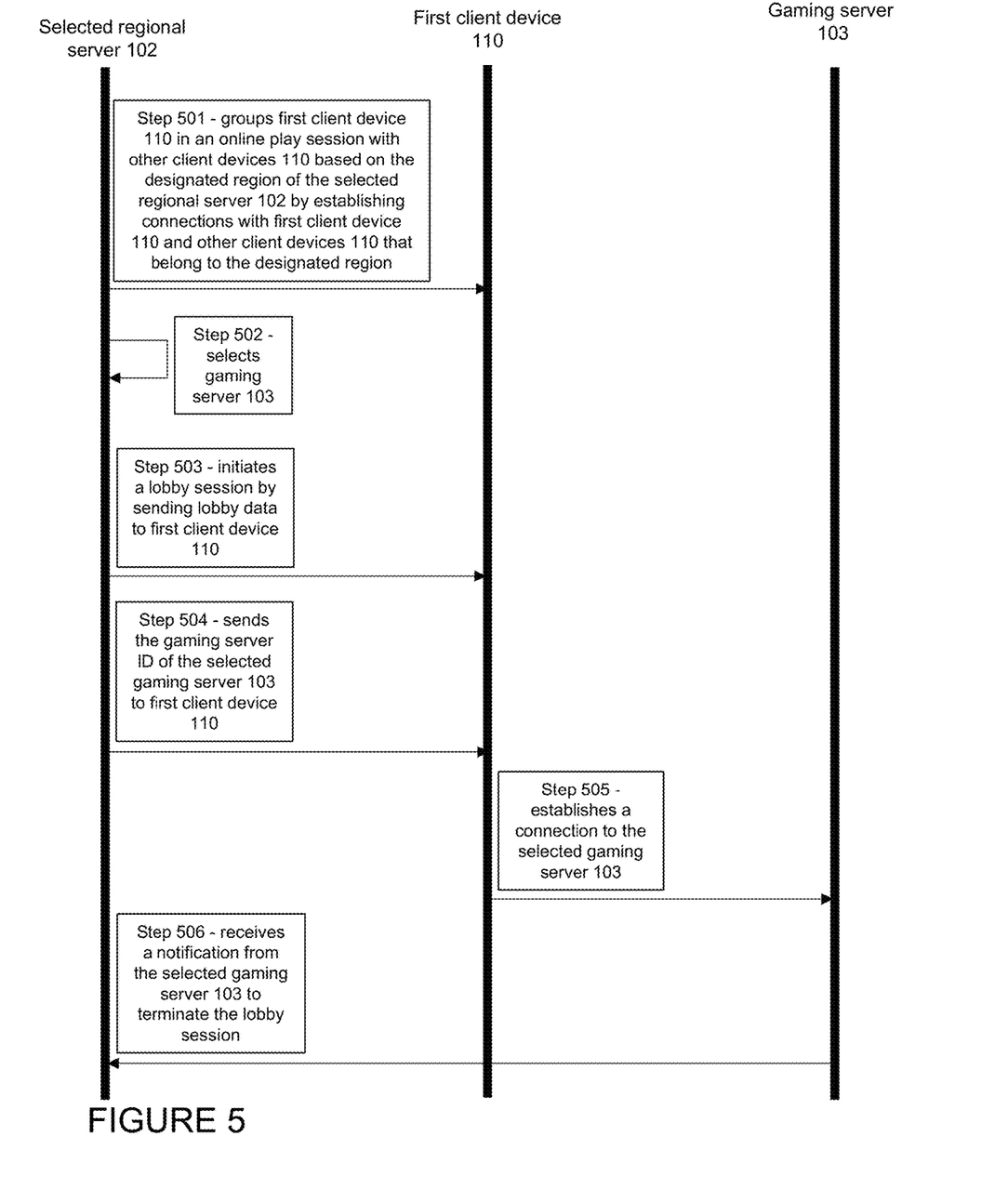
FIG. 5 shows a method that outlines the outlines a second part of the matchmaking process for online multi-player games, in accordance with certain embodiments

In step 408, the selected regional server 102 receives the player profile data associated with the identifier FIG. 5 shows a method that outlines the second part of the matchmaking process for online multi-player games, in accordance with certain embodiments.

In step 501, the selected regional server 102 groups first client device 110 in an online play session with other client devices 110 based on the designated region of the selected regional server 102 by establishing connections with first client device 110 and the other client devices 110 that belong to the designated region. In other words, first client device 110 and the other client devices 110 belong to the same region and the region information associated with the identifier sent by first client device 110 will match the region information associated with the identifiers sent by the other client devices 110. As first client device 110 and the other client devices 110 will be located within the designated region (i.e. same region), the latency during the subsequent gameplay for first client device 110 and the other client devices 110 will be more or less the same, thereby achieving the objective of fairness, and making the gameplay more equitable and even.

In step 502, the selected regional server 102 selects gaming server 103. In embodiments, there can be a plurality of gaming servers 103. The selected regional server 102 can have a service (GameServerManager) which maintains all the gaming servers 103 and assign the gaming servers based on workload. Alternatively, the selected regional server 102 can maintain a database of gaming servers 103 with their corresponding gaming server IDs. The selected regional server 102 can select gaming server 103 based on gaming considerations. These gaming considerations can be for example, client devices 110 having "similar" latency, or based on the language preferences of the players, or based on game history.

In step 503, the selected regional server 102 initiates a lobby session by sending lobby data to first client device 110.

In step 504, the selected regional server 102 sends the gaming server ID of the selected gaming server 103 to first client device 110.

In step 505, first client device 110 establishes a connection to the selected gaming server 103.

In step 506, the selected regional server 102 receives a notification from the selected gaming server 103 to terminate the lobby session. This can occur when all the client devices 110 in the online play session have established a connection to the selected gaming server 103.

Figure 6:
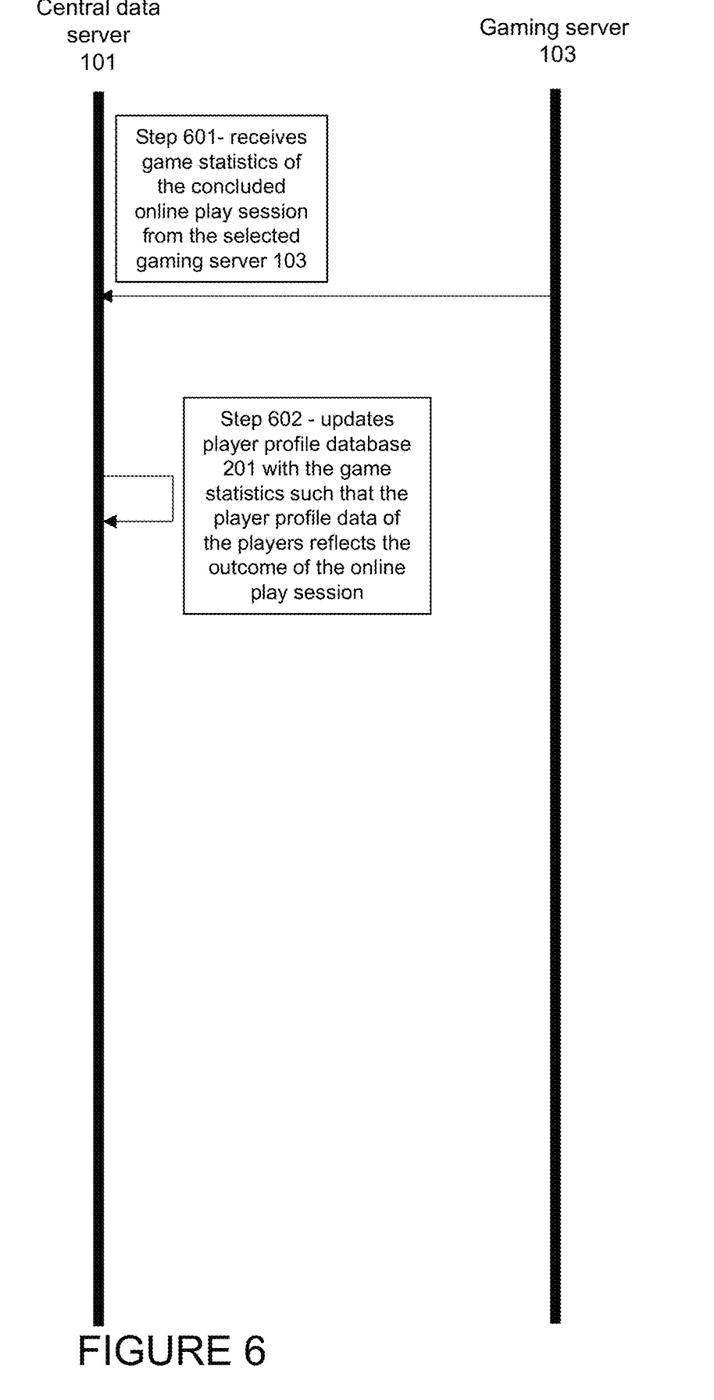
FIG. 6 shows a method for updating the player profile data with game statistics for online multi-player games, in accordance with certain embodiments.

FIG. 6 shows a method for updating the player profile data with the game statistics for online multi-player games, in accordance with certain embodiments.

In step 601, central data server 101 receives game statistics of the concluded online play session from the selected gaming server 103.

In step 602, central data server 101 updates player profile database 201 with the game statistics such that the player profile data of the players reflects the outcome of the online play session.

By having regional servers 102 perform matchmaking for client devices 110 based on their designated regions, regional servers 102 will only match client devices 110 that belong to their designated regions and are generally close together, and any latency during gameplay will be advantageously reduced. Furthermore, as the client devices 110 participating in the online play session would all be located within the same region, the latency during the subsequent gameplay for client devices 110 participating in the online play session will therefore be more or less the same, thereby achieving the objective of fairness and making the gameplay more equitable and even.

Further, central data server 101 serves as a nexus point in server architecture 100 for data storage and dissemination to regional servers 102. Central data server 101 stores and updates the player profile data and disseminates the player profile data to all regional servers 102. Central data server 101 is also responsible for determining which client devices 110 are to be allocated or assigned to which regional servers 102 for matchmaking. Thus, server architecture 100 is very scalable. If the online multi-player game is to be launched in a new region, all that needs to be done is to deploy new regional servers 102 to cater to the client devices 110 within the new region. These new regional servers 102 would be able to "piggy-back" on the existing infrastructure as provided by central data server 101 for player profile data, and for the allocation of client devices (which belong to the new region) to the new regional server for matchmaking, thereby significantly shortening the deployment time and avoiding the costs to set up additional servers.

Unless specifically stated otherwise, and as apparent from the following, it will be appreciated that throughout the present specification, discussions utilizing terms such as "receiving", "identifying", "initiating", "tagging", "transmitting", "running", "incrementing", "determining", "assigning", "approving", "selecting", "sending", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A server architecture for implementing an online multi-player game, the server architecture comprising:
    a plurality of regional servers, each of the plurality of regional servers having a designated region and configured to perform matchmaking for only client devices that belong to the designated region; and
    a central data server configured to:
        receive an identifier from a client device;
        select a regional server from the plurality of regional servers based on the identifier and the designated regions;
        send a regional server ID of the selected regional server to the client device; and
        provide player profile data to each of the plurality of regional servers;
    wherein the selected regional server is configured to:
    receive from the central data server, player profile data associated with the identifier; and
    perform matchmaking by grouping the client device in an online play session with other client devices that belong to the designated region of the selected regional server.

2. The server architecture of claim 1, wherein the central data server comprises a server database, the server database storing a relationship between the plurality of regional servers and the designated regions; and wherein the central data server selects a regional server from the plurality of regional servers based on the identifier and the designated regions by querying the server database with region information associated with the identifier, and determining at least one of the plurality of regional servers having the designated region that matches the region information associated with the identifier.

3. The server architecture of claim 2, wherein the region information associated with the identifier matches the region information associated with identifiers sent by the other client devices in the online play session.

4. The server architecture of claim 2, wherein the central data server determines that more than one of the plurality of regional servers has a designated region that matches the region information, and the central data server selects the regional server based on latency or workload or language considerations.

5. The server architecture of claim 2, wherein the central data server comprises a player profile database, the player profile database storing the identifier and the associated player profile data.

6. The server architecture of claim 1, wherein the plurality of regional servers are set up in an etcd network, and wherein the central data server selects a regional server from the plurality of regional servers based on the identifier and the designated regions by querying a configuration file and determining at least one of the plurality of regional servers having the designated region that matches the region information associated with the identifier.

7. The server architecture of claim 1, wherein the central data server is further configured to select the selected regional server from the plurality of regional servers based on a region as indicated by a current IP address of the client device, as opposed to selecting the selected regional server based on the identifier.

8. The server architecture of claim 1, further comprising a gaming server, wherein the selected regional server is further configured to send a gaming server ID of the gaming server to the client device; and wherein the central data server is further configured to receive game statistics of the online play session from the gaming server and update the player profile data associated with the identifier with the game statistics.

9. The server architecture of claim 8, wherein the selected regional server performs matchmaking by obtaining the latency of the client device with respect to the gaming server, and grouping the client device with the other client devices having a substantially similar latency with respect to the gaming server, in the online play session.

10. The server architecture of claim 1, wherein the selected regional server and the central data server are located in separate locations and the selected regional server is geographically closer to the client device than the central data server.

11. The server architecture of claim 1, wherein the identifier is a player ID or a device ID.

12. A method for implementing an online multi-player game, the method comprising:
    receiving, at a central data server, an identifier from a client device;
    selecting, at the central data server, a regional server from a plurality of regional servers based on the identifier and a designated region of each of the plurality of regional servers, each of the plurality of regional servers configured to perform matchmaking for only client devices that belong to the designated region, and the central data server is configured to provide player profile data to each of the plurality of regional servers;

sending, from the central data server to the client device, a regional server ID of the regional server;

receiving, at the regional server, the identifier from the client device;

sending, from the regional server to the central data server, the identifier;

receiving, at the regional server, player profile data associated with the identifier from the central data server; and performing, by the regional server, matchmaking, by grouping the client device in an online play session with other client devices that belong to the designated region of the regional server.

13. The method of claim 12 wherein the central data server comprises a server database, the server database storing a relationship between the plurality of regional servers and the designated regions; and the step of selecting, at the central data server, a regional server from a plurality of regional servers based on the identifier and a designated region of each of the plurality of regional servers comprises the steps of:

querying the server database with region information associated with the identifier; and determining that the designated region of at least one of the plurality of regional servers matches the region information associated with the identifier.

14. The method of claim 13, wherein the region information associated with the identifier matches the region information associated with identifiers sent by the other client devices in the online play session.

15. The method of claim 13 wherein more than one of the plurality of regional servers has the designated region that matches the region information, and the method further comprises the step of selecting the regional server based on latency or workload or language considerations.

16. The method of claim 13, wherein the central data server comprises a player profile database, the player profile database storing the identifier and the associated player profile data.

17. The method of claim 12, further comprising the step of:

selecting, at the central data server, the regional server from the plurality of regional servers based on a region as indicated by a current IP address of the client device, as opposed to selecting the regional server based on the identifier.

18. The method of claim 12, further comprising the steps of:

sending, from the regional server to the client device, a gaming server ID of a gaming server;

receiving, at the central data server, game statistics of the online play session from the gaming server; and updating, at the central data server, the player profile data associated with the identifier, with the game statistics.

19. The method of claim 18, wherein the step of performing matchmaking by the regional server comprises the steps of:

obtaining the latency of the client device with respect to the gaming server, and grouping the client device with the other client devices having a substantially similar latency with respect to the gaming server, in the online play session.

20. The method of claim 12, wherein the regional server and the central data server are located in separate locations and the regional server is geographically closer to the client device than the central data server.

* * * * *